United States Patent
Piock et al.

[11] Patent Number: 6,125,817
[45] Date of Patent: Oct. 3, 2000

[54] INTERNAL COMBUSTION ENGINE WITH SPARK IGNITION

[75] Inventors: Walter Piock; Martin Wirth, both of Hitzendorf, Austria

[73] Assignee: AVL List GmbH, Graz, Austria

[21] Appl. No.: 09/132,529

[22] Filed: Aug. 11, 1998

[30] Foreign Application Priority Data

Aug. 11, 1997 [AT] Austria .............................. GM501/97

[51] Int. Cl.[7] .................................................. F02B 31/00
[52] U.S. Cl. ........................ 123/301; 123/302; 123/305
[58] Field of Search ................................... 123/301, 302, 123/276, 279, 305, 295

[56] References Cited

U.S. PATENT DOCUMENTS

| 3,452,726 | 7/1969 | Szymanski . | |
|---|---|---|---|
| 4,920,937 | 5/1990 | Sasaki et al. | 123/302 |
| 5,127,379 | 7/1992 | Kobayashi et al. | 123/302 |

FOREIGN PATENT DOCUMENTS

| 001564 | 7/1997 | Austria . |
|---|---|---|
| 0694682 | 1/1996 | European Pat. Off. . |
| 2359971 | 2/1978 | France . |
| 1093138 | 5/1961 | Germany . |
| 25141 | 4/1963 | Germany . |

OTHER PUBLICATIONS

Scussel et al., *The Ford PROCO Engine Update*, SAE 780699, Aug. 1978.

*Primary Examiner*—John Kwon
*Attorney, Agent, or Firm*—Watson Cole Grindle Watson, P.L.L.C.

[57] ABSTRACT

An internal combustion engine with spark ignition and a piston that includes a substantially U-shaped asymmetrical piston depression with a depression floor that tapers towards an edge of the piston and that changes in a continuously rising manner into a depression wall, and an expanding squeezing chamber, the arrangement being adapted to promoting a swirling rather than a turbulent flow of injected fuel.

11 Claims, 5 Drawing Sheets

INTERNAL COMBUSTION ENGINE WITH SPARK IGNITION

BACKGROUND OF THE INVENTION

The invention relates to an internal combustion engine with spark ignition and at least one reciprocating piston, with an ignition device arranged in the zone of the cylinder axis and at least one fuel introduction device per cylinder for direct fuel introduction into the combustion chamber, which is limited by a roof-shaped combustion chamber cover surface of a cylinder head and the piston surface, from a radial position of the cylinder in the direction of the centre of the cylinder, and with at least one inlet conduit opening into the combustion chamber and producing a swirling flow in the combustion chamber, with the piston comprising a surface with an asymmetrical piston depression deflecting at least a portion of the injected fuel in the direction towards the ignition device.

DESCRIPTION OF THE PRIOR ART

Continuously rising demands placed on fuel consumption and the reduction of the exhaust gas emissions, and hydrocarbons in particular, require the use of new technologies in the field of internal combustion engines. As a result of currently common use of an external formation of mixture in Otto engines such as by using a suction pipe injection or a carburettor, a portion of the mixture sucked into the combustion chamber and cylinder during the valve crossover phase when the outlet and inlet valve are simultaneously open flows into the exhaust section of the internal combustion engine. A far from inconsiderable part of the measurable uncombusted hydrocarbons in the exhaust section also originates from mixture particles which are situated during the combustion in annular gaps or regions close to the wall where no combustion occurs. In addition to these aforementioned points, there is the required homogenization of the cylinder loading at an approximately stoichiometric mixture ratio of fuel and air which ensures a secure and misfire-free combustion. This requires a control of the engine load with the help of a throttle member for limiting the total mixture quantity that is taken in (quantity control).

This throttling of the suction flow leads to a thermodynamical loss which increases the fuel consumption of the internal combustion engine. The potential for the reduction of the consumption of the internal combustion engine can be estimated with approx. 20% by circumventing this throttling.

In order to avoid or reduce these disadvantages efforts have been made for a long time to operate spark-ignited internal combustion engines without throttling and to introduce the fuel only after ending the air intake within the combustion chamber and the cylinder, as in a self-igniting internal combustion engine.

From SAE 780699 a method is known in which the fuel is injected by means of a high-pressure injection nozzle directly into the combustion chamber of the internal combustion engine. The required time for the preparation of the mixture limits the temporal minimum distance between injection time and ignition time. A high pressure level is required for the injection process in order to obtain short injection times on the one hand and a favourable atomization of the fuel with respectively small spectrum of drops on the other hand. The preparation and dosing of the fuel occurs simultaneously. In order to obtain a merely only locally limited region with combustible fuel-air mixture it is necessary on the other hand to introduce the fuel only very late in the engine cycle (optionally only during the compression shortly before the ignition) in order to limit the time for the dispersion and dilution of the mixture in the combustion chamber air. The demand for sufficiently early injection for the purpose of complete fuel evaporation and the latest possible injection for maintaining the mixture layering are therefore in mutual opposition. It is thus the object of producing a locally limited mixture cloud from the injected fuel quantity, transporting the same from the orifice of the injection member to the vicinity of the ignition device and further mixing the mixture within the cloud with combustion chamber air. In this respect the following items are relevant:

The mixture cloud must remain clearly delimited particularly at low engine loads and should be located as far as possible in the centre of the combustion chamber for thermodynamical reasons and for reducing the emissions.

The mixture of the introduced fuel to an ignitable and preferably stoichiometric air ratio must occur in the short time interval between injection time and ignition time.

An important problem of such a combustion method lies in the cyclic fluctuations of the mixture forming process, i.e. the change of the sequence from one engine cycle to the next as a result of the turbulence of the flow processes in the suction system and cylinders of the internal combustion engine. In order to keep these fluctuations as small as possible, a form of flow should be produced in the cylinder which has a high stability and is maintained particularly during the compression phase of the engine cycle and does not change into random turbulent movements of flow.

This demand is fulfilled best by a swirling flow.

A swirling flow is understood as being the rotational flow in the cylinder which occurs in the known manner about an axis substantially parallel to the cylinder axis which is caused by the arrangement of the inlet conduit and the orifice of the inlet conduit(s) into the combustion chamber and cylinders of the internal combustion engine. During the compression there is only a slight change of the flow image, because the diameter of the vortex is not changed by the piston movement. Prior to the top dead center there is thus a stable rotational movement of the intaken air in the combustion chamber and cylinder.

The already mentioned cyclic fluctuations of the air ratio in the ignition region depend strongly on the distance of the injection nozzle from the ignition device and thus on the length of path which the injection jet has to cover up to the ignition device.

In addition to the reduction of the fluctuations by producing the most stable possible form of flow, the injection jet and the mixture cloud thus arising must be additionally guided by the combustion chamber geometry, which requires an at least partial wall application of the fuel by the injection jet. In order to ensure that this wall surface film of the fuel does not lead to increased formation of exhaust particulates and to delayed combustion, the inner flow of the cylinder must contribute to an intensive evaporation of this wall film and its convective transport to the ignition region.

Simultaneously, the combustion chamber surface, relating to the combustion chamber volume, should be kept as small as possible in order to limit wall heat losses particularly during homogenous operation.

From EP 0 694 682 A1 an internal combustion engine of the kind mentioned above with direct injection is known in which a swirling flow is produced in the cylinder chamber by shaping the inlet conduits. The piston surface is provided with a marked squeeze surface encompassing a piston depression, with the depression being eccentrically arranged in such a way that the ignition device being located centrally in the combustion chamber and the radially arranged injection valve are each located on the edge of the depression. The fuel is purposefully injected towards the floor of the depression moulded especially for this purpose. The piston surface therefore has the object of primarily deflecting the fuel jet. The swirling flow has the object of transporting the fuel deflected by the edge of the depression to the ignition device.

SUMMARY OF THE INVENTION

The object of the invention is the realization of a combustion method under the outlined boundary conditions on the basis of an inlet-generated swirling flow in the cylinder chamber of the internal combustion engine. It is intended to particularly achieve a stable operation over a wide range of the engine diagram.

This is achieved in accordance with the invention in that the piston depression is arranged with an arrangement tapering towards the edge of the piston and the edge of the piston depression is provided substantially with a U-shape as seen in the top view, that the depression floor changes in a continuously rising manner into the depression wall and that the piston surface encompassing the piston depression forms, as seen in the direction of the swirling flow, an expanding squeezing chamber at the top dead center of the piston in conjunction with the combustion chamber cover surface. As a result, the stable swirling flow is used to transport the injected fuel to the ignition device by using the piston geometry and to simultaneously improve the local preparation of the mixture. The piston depression is provided with a compact arrangement and is located approximately in the centre of the combustion chamber for the guidance of the injection jet and for controlling the stratified fuel-air mixture. The asymmetrical formation of the piston edge encompassing the depression supports the inflow of an oblique swirling flow into the region of the depression. The piston surface is arranged in such a way that the smallest possible surface-to-volume ratio is achieved. The swirling flow is supported during the upward movement of the piston by the squeezing chamber which increases in the direction of the swirling flow.

The swirling flow is guided into the region of the piston depression in particular if the piston surface consists in the direction of the rotating flow of three different, mutually successive angular sectors, with the surface in the first sector in the top dead center of the piston movement approaching the combustion chamber cover surface up to a residual distance which is preferably between 1 and 5 mm and extending substantially parallel to the same and the surface in the second sector dropping continuously up to a plane formed by the piston edge and the piston depression being substantially open towards the cylinder wall in the third sector. It is provided in detail that the first angular sector, measured in the direction of the swirling flow, encloses an angular range of approx. 70° to 120° about the cylinder axis, that the second angular sector encloses an angular range of approx. 130° to 200° about the cylinder axis and that the third angular sector encloses an angular range of approx. 60° to 160° about the cylinder axis. During the upward movement of piston an additional swirl leading to the piston is produced by the surface of the piston which is partly arranged as a squeezing surface, as a result of which the inner cylinder flow generated by the air inlet members of the internal combustion engine is accelerated during the compression phase and is guided to the ignition device by way of the surface used by the fuel jet.

It is preferably provided in this respect that the depression wall in the zone of the first and second angular sector is arranged in the zone of the upper edge with a deviation of a maximum of ±20° parallel to the cylinder axis. In order to keep the depression as compact as possible it is advantageous if, as seen in the direction of the cylinder, the smallest distance between the upper edge of the depression and the ignition device is a maximum of 0.3 times the piston diameter D. The ignition device is preferably arranged above the piston depression.

In a particularly preferred embodiment of the invention it is provided that the orifice of the fuel injection device is arranged in the combustion chamber wall on the cylinder head side at a distance from the cylinder axis of between 0.3 to 0.5 times the piston diameter D, with the central line of the injection jet to the cylinder axis or a straight line parallel to the cylinder axis being inclined at an angle of approx. 20° to 70° and, as seen in horizontal projection, being directed approximately radially into the combustion chamber. It is further provided that the injection jet impinges completely within the piston depression on the piston surface in at least one position of the piston. This allows for a particularly favourable concentration of the fuel vapour transported by the accelerated flow into a partial region of the combustion chamber volume.

BRIEF DESCRIPTION OF THE DRAWINGS

The invention is now explained in closer detail by reference to the figures, wherein.

Parts with the same function are provided in the embodiments with the same reference numerals.

DETAILED DESCRIPTION OF PREFERRED EMBODIMENTS

Figure 1:
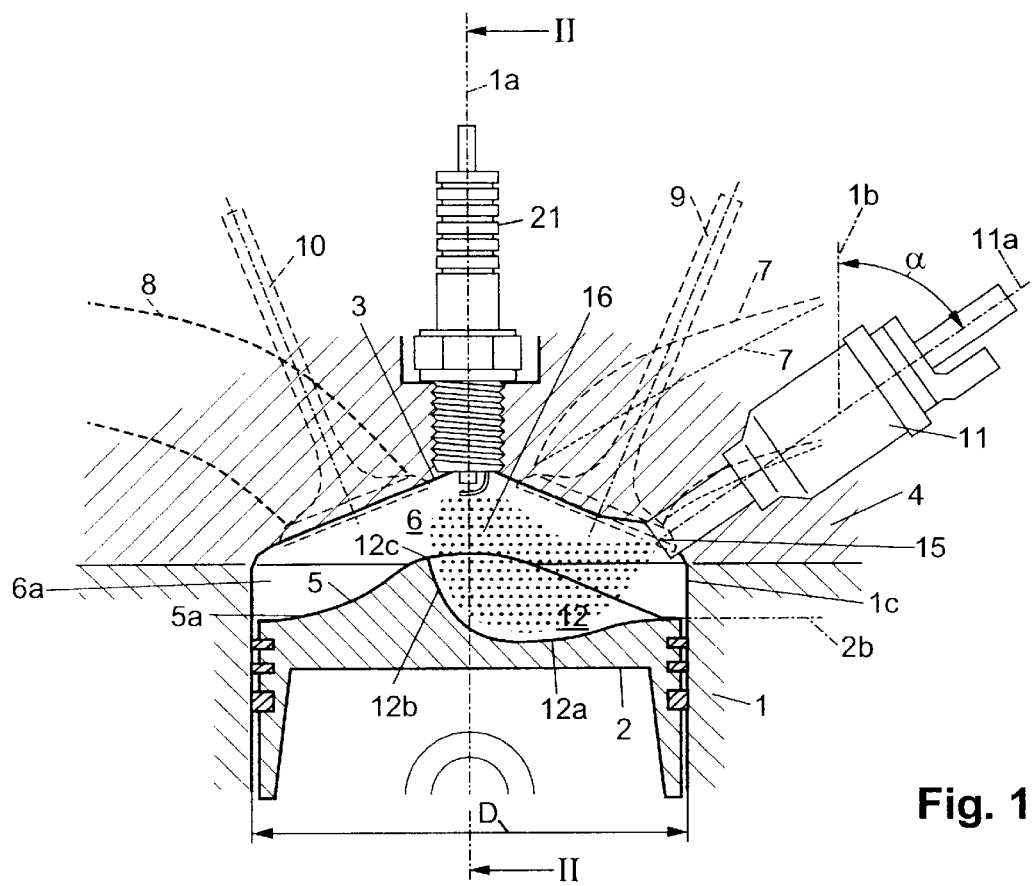
FIG. 1 shows a cross section through a cylinder of an internal combustion engine in accordance with the invention pursuant to line I—I in FIG. 2.
Figure 2:
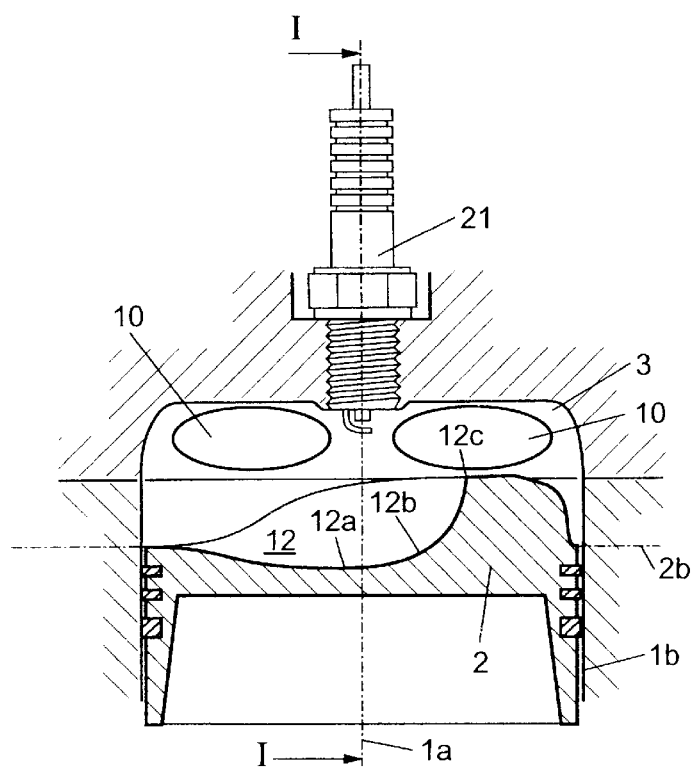
FIG. 2 shows a cross section through said cylinder pursuant to line II—II in FIG. 1.

A reciprocating piston 2 is arranged longitudinally movable in a cylinder 1 of an internal combustion engine. As a result of the roof-like combustion chamber cover surface 3 of the cylinder head 4 and the piston surface 5 of the piston 2 a combustion chamber 6 is formed into which one or several inlet conduits 7 and at least one outlet conduit 8 open by way of inlet valves 9 and outlet valves 10. An ignition device 21 is arranged in the zone of cylinder axis 1a, which device is formed by a spark plug. A fuel injection device 11 opens into the combustion chamber through the combustion chamber cover surface, with the orifice 15 being situated in the region of cylinder wall 1c.

The axis 11a of the fuel injection jet is provided with an angle α of 20° to 70° towards a straight line 1b which is parallel to the cylinder axis 1a. The orifice 15 of the fuel injection device 11 is located at a distance a of between 0.3 to 0.5 times the piston diameter D from the cylinder axis 1a.

A part of the piston surface 5 is arranged as a piston depression 12 tapering towards the piston edge 2a. The floor 12a of the piston depression 12 changes continuously into the depression wall 12b which in the region of the upper edge 12c of the depression 12 is arranged approximately in the direction of the cylinder axis 1a. The fuel injection device 11 is directed into the piston depression 12, so that as a result of the mixture of the injected fuel with the air entering the combustion chamber as a swirling flow 13 a mixture cloud 16 is obtained which as a result of the shape of the depression is guided in the direction of the ignition source 11, as is indicated schematically in FIG. 1.

The piston surface 5a encompassing the piston depression 12 consists, as seen in the direction of the entering swirling flow 13, of three different, mutually consecutive angular sectors A, B and C, as is shown in the FIGS. 3 to 9. The first sector A extends over an angular range of approx. 70° to 120°, starting in the region in which the upper edge 12c of the piston depression 12 tapers out into the piston floor 12a. The surface 5 of the piston 2 extends in the first sector approx. parallel to the combustion chamber cover surface 3 and approaches the combustion chamber cover surface 3 in the top dead centre of the piston 2 up to a residual distance of between 1 and 5 mm. The second sector B extends over an angular range of approx. 130° to 200° and is provided with the particularity that surface 5a of piston 2 which forms a squeezing surface sinks continuously up to the plane 2b as formed by the piston edge 2a. In the third sector C, which extends over an angular range of approx. 60 to 150° about the cylinder axis 1a, the piston depression 12 is substantially open towards the cylinder wall 1b. The central axis 11a of the injection jet is located, as seen in the axial direction of the cylinder, within said third sector C.

The arrangement of the surface of piston 2 in the sectors A, B and C causes that the inlet-generated swirling flow, which is indicated in FIGS. 3 to 10 with the reference numeral 13, is accelerated during the compression process and is guided over the surface of piston depression 12 which is moistened by the fuel jet to the ignition device 11. It is achieved simultaneously that the fuel conveyed by the accelerated flow 13 concentrates in a partial region of the combustion chamber 6.

The combustion chamber depression 12 and the ignition device 11 are preferably arranged in such a way that the smallest distance s between the upper edge 12c of depression 12 and the ignition device 11 is a maximum of 0.3 times the piston diameter D. The ignition device 11 is preferably located above the depression 12.

Figure 3:
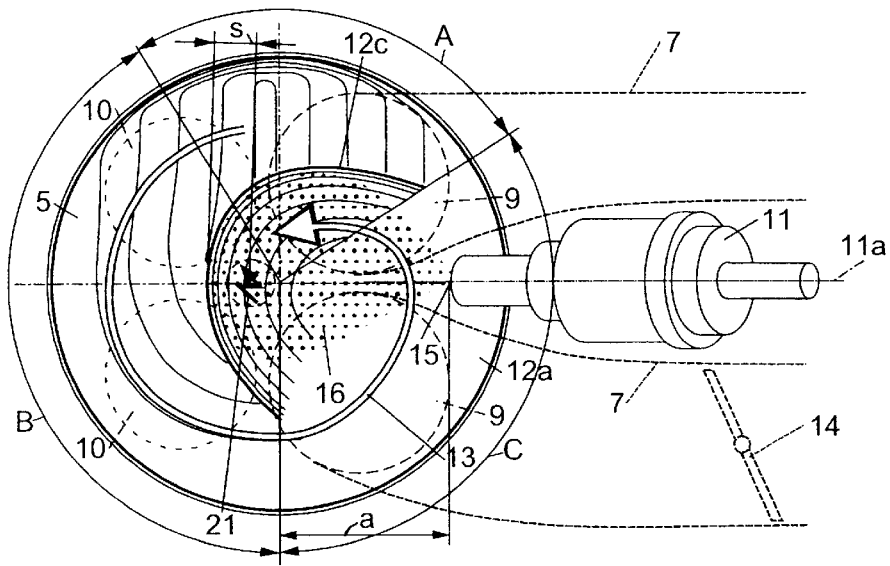
FIG. 3 shows a top view on the cylinder of FIG. 1 and 2.
Figure 4:
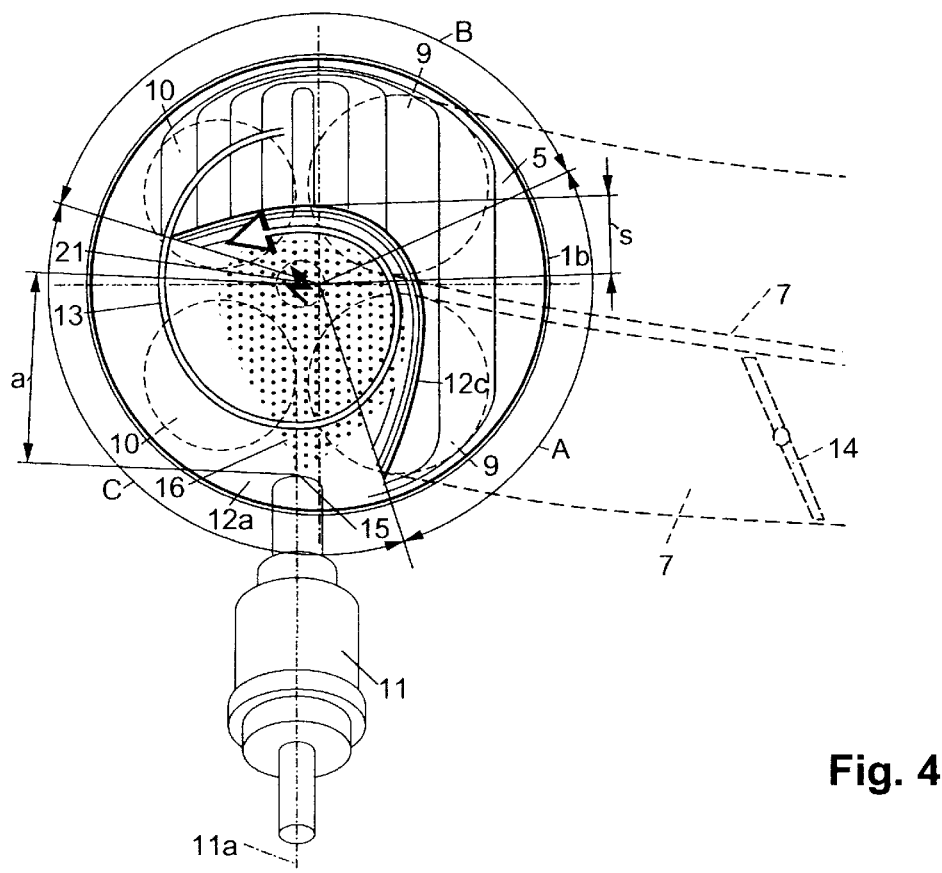
FIG. 4 shows another embodiment of the invention in a top view on the cylinder.

FIGS. 3 and 4 show embodiments with two inlet valves 9 and two outlet valves 10, with one inlet conduit 7 leading to each inlet valve 9. A conduit shut-off member 14 can be arranged in at least one inlet conduit 7. The fuel injection device 11 is arranged either between the two inlet ducts 7 (FIG. 3) or in the region between one inlet valve 9 and one outlet valve 10 (FIG. 4).

Figure 5:
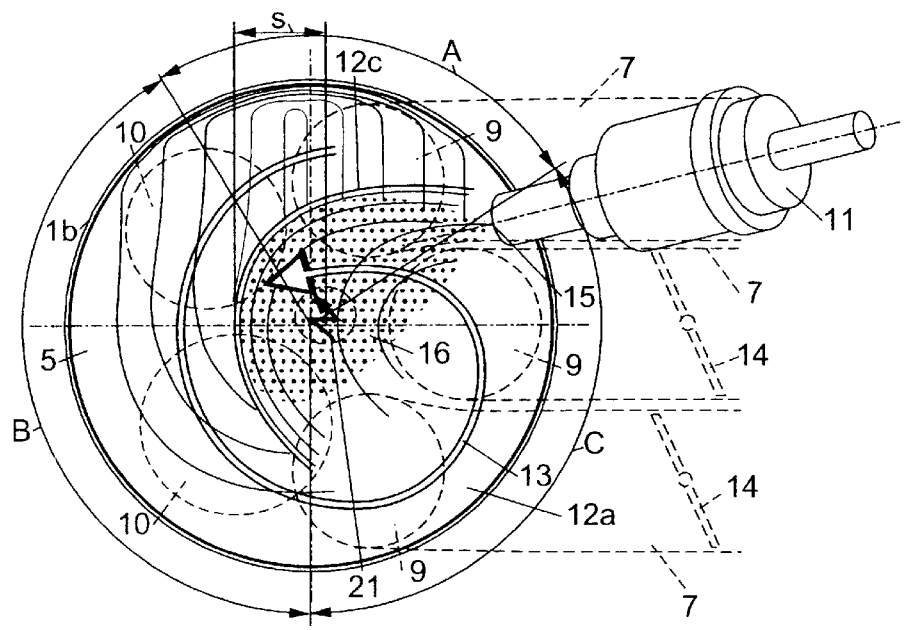
FIGS. 5 and 6 show further embodiments of the invention with five valves per cylinder.
Figure 6:
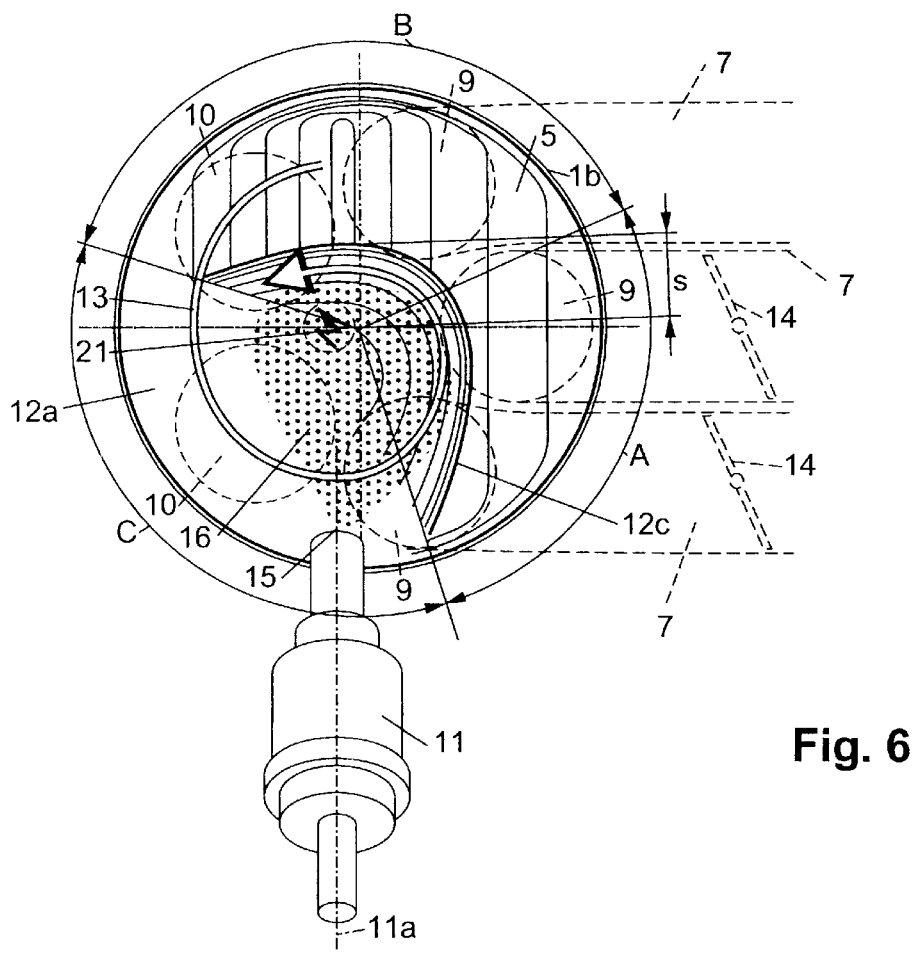

FIGS. 5 and 6 show embodiments in accordance with the invention with five valves, namely three inlet valves 9 and two outlet valves 10 per cylinder. Two of the three inlet conduits 7 leading to the inlet valves 9 can be provided with conduit shut-off members 14 in order to produce the desired swirling flow 13. The injection of the fuel can occur through the fuel injection device 11 between two inlet valves 9 (FIG. 5) or between one inlet valve 9 or an outlet valve 10 (FIG. 6).

Figure 7:
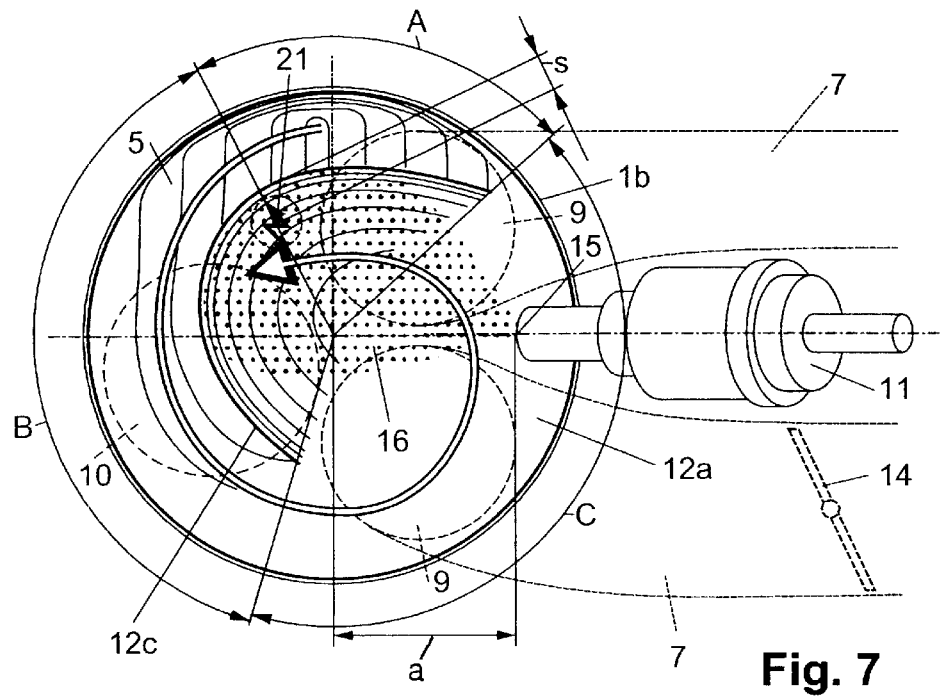
FIGS. 7 and 8 show further embodiments of the invention with three valves per cylinder.
Figure 8:
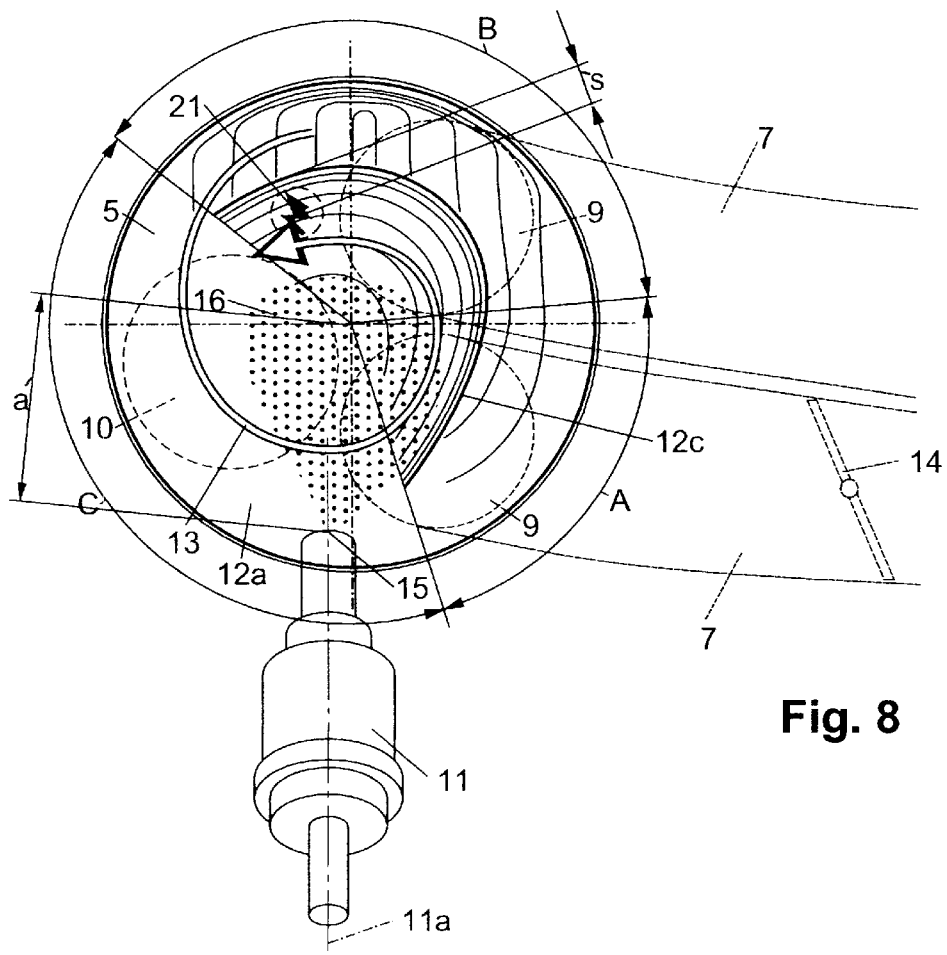

FIGS. 7 and 8 show embodiments for internal combustion engines with three valves, namely two inlet valves 9 and an outlet valve 10 per cylinder 1. One of the two inlet conduits 7 leading to the inlet valves 9 is equipped with a conduit shut-off device 14 for producing the required swirling flow 13. The fuel injection can occur, in analogy to the embodiments as described above, by way of fuel injection device 11 which is arranged between two inlet valves 9 (FIG. 7) or between an inlet valve 9 and the outlet valve 10 (FIG. 8).

Figure 9:
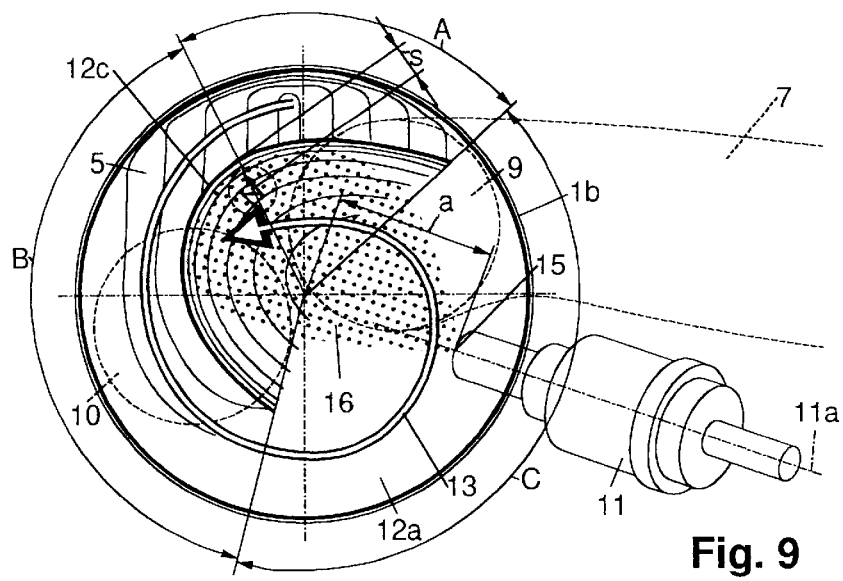
FIG. 9 shows a further embodiment with two valves per cylinder in a top view and FIG. 10 shows a spatial representation of the piston surface of the internal combustion engine in accordance with the invention.

FIG. 9 shows a simple embodiment for internal combustion engines with an inlet valve 9 and an outlet valve 10 per cylinder 1. In this case too the inlet conduit 7 is arranged with a swirl-producing arrangement, so that during the filling of the cylinder and during the compression process a marked swirling flow 13 is obtained which is supported by the shape of the piston in accordance with the invention.

Figure 10:
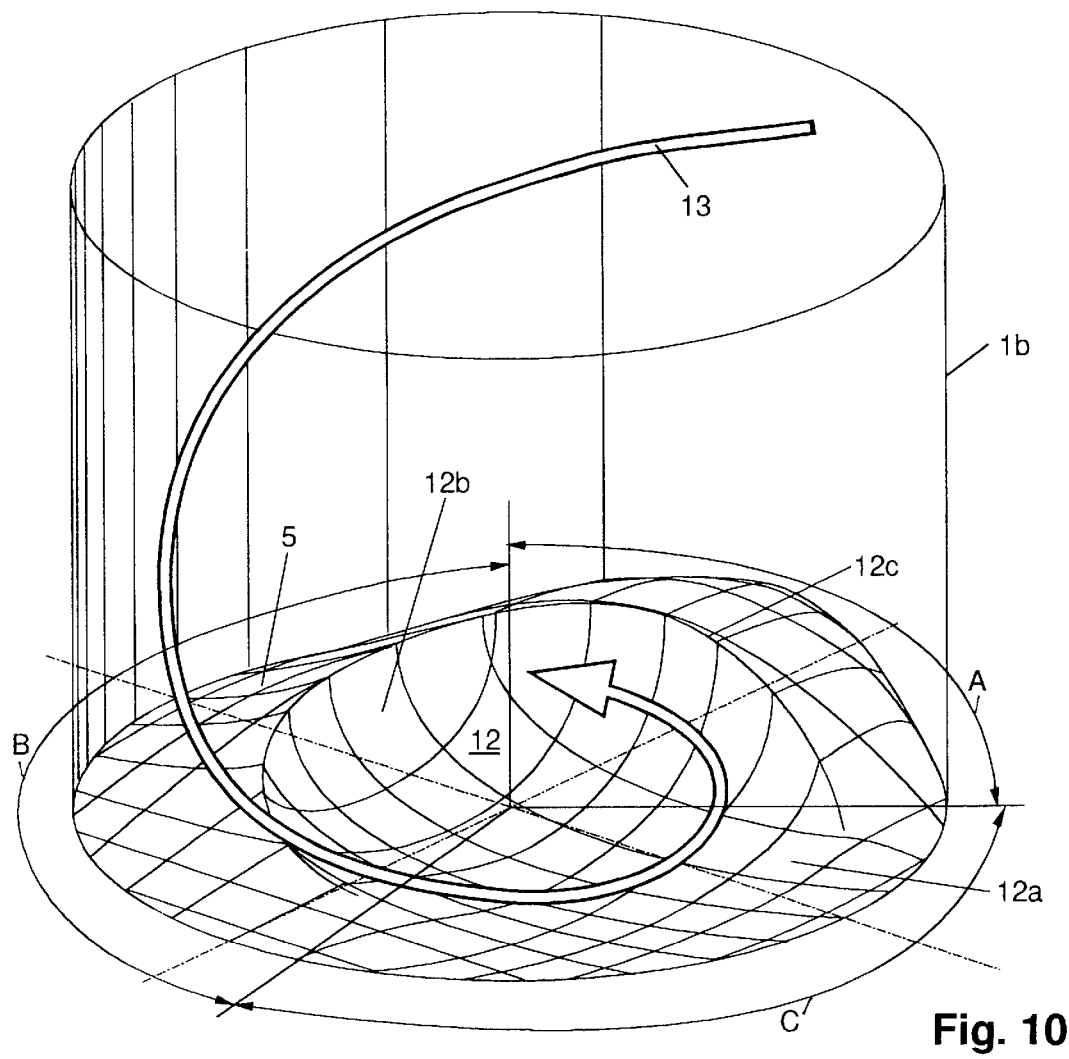

FIG. 10 shows a three-dimensional view of the piston surface 5 of piston 2 as arranged in accordance with the invention. During the compression process the swirling flow 13 is accelerated in the angular sector B and is guided in the angular sector C over the piston floor 12a which is moistened with fuel. The portion of the injected fuel which impinges on piston 2 is deflected in the direction towards the ignition device 21 and the fuel conveyed by the accelerated flow 13 is simultaneously concentrated in a partial region of combustion chamber 6.

We claim:

1. An internal combustion engine with spark ignition and at least one reciprocating piston, comprising:

an ignition device arranged in a roof-like combustion chamber cover surface formed by a cylinder head, at least one fuel introduction device per cylinder for direct fuel introduction into a combustion chamber from a radial position of the cylinder in the direction of a center of the cylinder, said combustion chamber being limited by the roof-shaped combustion chamber cover surface and a piston surface of a piston, with the piston comprising a surface with an asymmetrical piston depressing having a depression floor and a depression wall deflecting at least a portion of the injected fuel in the direction towards the ignition device, and at least one inlet conduit opening into the combustion chamber and producing a swirling flow in the combustion chamber and producing a swirling flow in the combustion chamber, wherein the piston depression is provided with an arrangement tapering towards an edge of the piston and the edge of the piston depression is provided substantially with a U-shape as seen in the top view, and wherein the depression floor changes in a continuously rising manner into the depression wall and wherein the piston surface encompassing the piston depression forms, as seen in the direction of the swirling flow, an expanding squeezing chamber at the top dead center of the piston in conjunction with the combustion chamber cover surface, wherein the piston surface consists in the direction of the rotating flow of three different, mutually successive angular sectors, with the surface in a first sector approaching in the top dead center of the piston movement the combustion chamber cover surface up to a residual distance, and extending substantially parallel to the same, and the surface in a second sector dropping continuously up to a plane formed by the piston edge and the piston depression being substantially open towards the cylinder wall in a third sector.

2. An internal combustion engine according to claim 1, wherein the residual distance is between 1 and 5 mm.

3. An internal combustion engine according to claim 2, wherein the first angular sector, as measured in the direction of the swirling flow, encloses an angular range of approx. 70° to 120° about the cylinder axis.

4. An internal combustion engine according to claim 1, wherein the second angular sector encloses an angular range of approx. 130° to 200° about the cylinder axis (1*a*).

5. An internal combustion engine according to claim 1, wherein the third angular sector encloses an angular range of approx. 60° to 160° about the cylinder axis.

6. An internal combustion engine according to claim 1, wherein a central axis of an injection jet of the fuel introduction device intersects in the top dead center of the piston the piston surface in the region of the piston depression within the third sector.

7. An internal combustion engine according to claim 1, wherein the depression wall in the zone of the first and second angular sector is arranged in the zone of the upper edge with a deviation of a maximum of ±20° parallel to the cylinder axis.

8. An internal combustion engine according to claim 1, wherein, as seen in the direction of the cylinder, the smallest distance between the upper edge of the depression and the ignition device is a maximum of 0.3 times the piston diameter.

9. An internal combustion engine according to claim 1, wherein an orifice of the fuel introduction device is arranged in the combustion chamber wall on the cylinder head side at a distance from the cylinder axis of between 0.3 to 0.5 times a piston diameter, with the central line of the injection jet to the cylinder axis or a straight line parallel to the cylinder axis being inclined at an angle of approx. 20° to 70° and, as seen in horizontal projection, being directed approximately radially into the combustion chamber.

10. An internal combustion engine according to claim 1, wherein the injection jet impinges completely on the piston surface within the piston depression in at least one piston position.

11. An internal combustion engine according to claim 1, wherein the ignition device is arranged above the piston depression.

* * * * *